United States Patent [19]

Gottung et al.

[11] 4,226,903
[45] * Oct. 7, 1980

[54] ELECTRICAL INSULATING SHEET MATERIAL AND ELECTRICAL WINDING MADE THEREFROM

[75] Inventors: William H. Gottung, Ballston Lake; Kevork A. Torossian, Schenectady, both of N.Y.

[73] Assignee: General Electric Company, Schenectady, N.Y.

[*] Notice: The portion of the term of this patent subsequent to Aug. 7, 1996, has been disclaimed.

[21] Appl. No.: 936,961

[22] Filed: Aug. 25, 1978

Related U.S. Application Data

[63] Continuation of Ser. No. 836,095, Sep. 23, 1977.

[51] Int. Cl.³ .................. B32B 7/14; D02G 3/00; H02K 15/12
[52] U.S. Cl. .................. 428/195; 156/53; 156/55; 174/110 SR; 174/117 A; 310/45; 310/198; 428/377
[58] Field of Search .................. 428/195, 377; 156/53, 156/55; 310/198, 201, 180, 45; 174/110 S, 110 E, 110 SR, 117 A

[56] References Cited

U.S. PATENT DOCUMENTS

| | | | |
|---|---|---|---|
| 2,361,842 | 10/1944 | Heintz et al. | 310/201 |
| 2,756,358 | 7/1956 | Johnson | 310/180 |
| 3,162,722 | 12/1964 | Bartos | 174/110 S |
| 3,246,271 | 4/1966 | Ford | 336/94 |
| 3,614,497 | 10/1971 | Brenner | 310/201 X |
| 3,666,615 | 5/1972 | Iwai et al. | 428/377 |
| 3,743,875 | 7/1973 | Smith et al. | 310/201 X |
| 3,930,915 | 1/1976 | Mendelsohn et al. | 156/53 |
| 4,163,912 | 8/1979 | Gottung et al. | 310/45 |

*Primary Examiner*—Thomas J. Herbert, Jr.
*Attorney, Agent, or Firm*—Vale P. Myles

[57] ABSTRACT

Electrical insulating sheet material characterized by a coating of thermosetting resinous adhesive material distributed over two sides of a sheet of aramid paper, in combination with a pattern of pressure sensitive adhesive material applied to one side of the aramid paper sheet.

8 Claims, 10 Drawing Figures

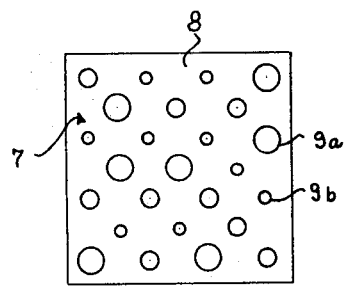
FIG. 2A
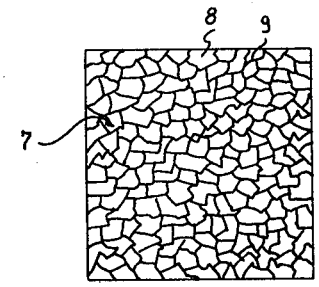
FIG. 2B
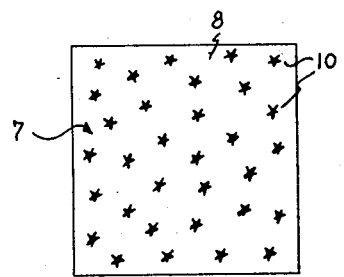
FIG. 2C
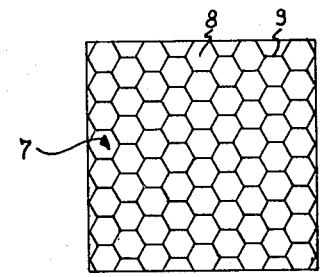
FIG. 2D
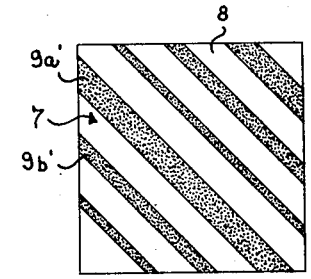
FIG. 2E
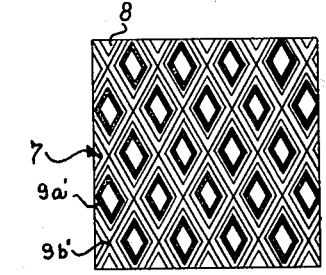
FIG. 2F
FIG. 2

ELECTRICAL INSULATING SHEET MATERIAL AND ELECTRICAL WINDING MADE THEREFROM

This is a continuation of application Ser. No. 836,095, filed Sept. 23, 1977.

BACKGROUND OF THE INVENTION

The invention relates to electrical insulating sheet material and to insulated electrical windings incorporating such sheet material. More particularly, the invention relates to an insulating sheet material that can be thermally cured under high pressure without causing the sheet material or any of its component parts to either creep or be extruded from between members on which the material is bonded.

It is common practice in the manufacture of insulated electrical windings, such as those used in electrical motors or in power transformers, to insulate the respective turns of the windings from one another by placing insulating sheet material between the winding turns. Such sheet material insulation is normally only required on high voltage windings or windings having relatively large turns which inherently develop relatively high voltages between the adjacent turns of the winding. For a number of years sheets of asbestos material have been used to provide this dielectric function in making large windings for rotating dynamoelectric machines or for high voltage electric transformers. While asbestos sheet material possesses a number of excellent characteristics for this application, it is relatively difficult and expensive to handle in many manufacturing environments. Moreover, a significant disadvantage involved in the use of asbestos sheet material to insulate the winding turns of such high voltage apparatus is that the insulating sheet must be cut in sections to completely cover facing sides of adjacent turns of the windings. Inevitably, undesirably large amounts of airborne asbestos particles are formed by such cutting operations so it is necessary to perform the operations in carefully controlled environments that protect the respiratory systems of workers from damage that might be inflicted by the airborne asbestos particles.

It is also a typical practice in the manufacture of prior art high voltage electrical windings to use resinous adhesive materials to form bonds between winding turns and sheets of dielectric material positioned between the respective turns of the windings. A wide variety of materials have been used with different degrees of success to perform this bonding function on given types of high voltage electrical windings. However, prior to the present invention, all known combinations of resin bonding adhesives and dielectric sheet material have exhibited certain common disadvantages. In addition to the problem of airborne asbestos particles just mentioned, generally speaking, known combinations of dielectric sheet material and resinous bonding adhesives typically present the following common types of manufacturing problems. They are difficult to handle and accurately position between the turns of electrical windings during the initial manufacturing phases of a winding operation. Further, these known prior art insulating materials tend to creep or extrude from between the turns of the windings when the windings are subjected to high pressure compression during normal bonding operations that are employed to cure the bonding resins and to uniformly distribute the resins over the adjacent surfaces of the winding turns. Also, some combinations of prior art insulating sheet materials do not exhibit as long a shelf life or as desirable a bonding strength as is normally preferred in the manufacture of high voltage electrical windings such as those used on dynamoelectric machines or high voltage transformers. Finally, many of the known prior art insulating sheet materials become thermally unstable when subjected to more than a narrow range of temperatures or when subjected to given temperatures for an extended period of time.

Of course, it is desirable to improve the thermal stability and thermal aging characteristics of insulating sheet material used in the manufacture of high voltage electrical windings so that their overall operating characteristics will be enhanced and extended. It would also be desirable to provide an insulating sheet material that can be easily and efficiently applied to form an excellent dielectric barrier between adjacent turns of high voltage windings with a minimum of application effort and required labor content. Specifically, it would be desirable to provide such a material that can be quickly and easily applied to completely insulate adjacent turns of windings from one another and at the same time to form an insulating barrier between the winding turns which will not require additional treatment after it is cured in order to place the insulated windings in condition for assembly into a rotating dynamoelectric machine or a power transformer. For certain types of windings it has been found to be desirable to fold sheets of insulating material around the edges of the winding turns, thus, it is necessary to provide insulating sheet material that can be folded in 180 degree bends without fracturing, tearing or losing its insulating properties at the folds.

OBJECTS OF THE INVENTION

Accordingly, it is a primary object of the present invention to provide an electrical insulating sheet material and electrical windings insulated with such sheet material that are efficient and economical to manufacture and that obviate the disadvantages of prior art insulating materials and windings, as noted above.

A further object of the invention is to provide an electrical insulating sheet material that can be readily, reliably and efficiently applied to insulate the turns of a winding from one another in an environment free of asbestos dust.

Yet another object of the invention is to provide an electrical insulating sheet material that includes a pressure sensitive adhesive to hold the sheet material, with at least a predetermined minimum peel strength, in a predetermined position when it is initially positioned on an electrical winding, in combination with a thermosetting resinous adhesive that is curable under high pressure to form a permanent bond between a creep resistant sheet of dielectric paper and the turns of a conductor between which the insulating material is positioned.

Still another object of the invention is to provide an electrical insulating sheet material that exhibits good thermal aging, stability and bond strength properties for use in applications where the aramid paper is folded in 180 degree bends and subjected to high pressures and temperatures.

A further object of the invention is to provide an electrical winding having its turns insulated with a sheet material that is safe to apply and that is not forced to creep or to extrude from between turns of the winding when the turns are subjected to high pressures during a baking operation.

Additional objects and advantages of the invention will be apparent to those skilled in the art from the description of it presented herein with reference to the accompanying drawings.

SUMMARY OF THE INVENTION

In one preferred embodiment of the invention an electrical insulating sheet material is formed by coating a sheet of non-cellulosic paper, such as aramid paper, on two sides with a uniformly distributed coating of thermosetting resinous adhesive material that is in a solid but heat bondable state, in combination with a pattern of pressure sensitive adhesive material applied to one side of the insulating paper. An electrical winding made by using the electrical insulating sheet material of the invention is formed by positioning pre-cut to size sheets of the material between facing flat sides of the winding and securing the insulating material in position with the pressure sensitive adhesive. Subsequently, the winding is compressed and baked to cure the resinous adhesive material and form a permanent bond between the insulating paper and the sides of the winding turns. In a particularly preferred embodiment of the invention 25 folded sheets of the insulating material are positioned around selected sides of the winding turns in a predetermined pattern that places adjacent sections of the sheet material in tightly abutting relationship, i.e., within a tolerance of about +0.000 to −0.060 inches, to completely cover the flat sides of the winding turns while preventing any of the joints between the sheets of insulating material from overlying one another.

DESCRIPTION OF THE DRAWINGS

FIG. 2 includes sub-FIGS. 2A through 2F each of which comprises, respectively, top plan views of different sheets of electrical insulating material constructed according to the present invention with a variety of patterns of pressure sensitive adhesive material applied to one side thereof.

DESCRIPTION OF THE PREFERRED EMBODIMENT

Figure 1:
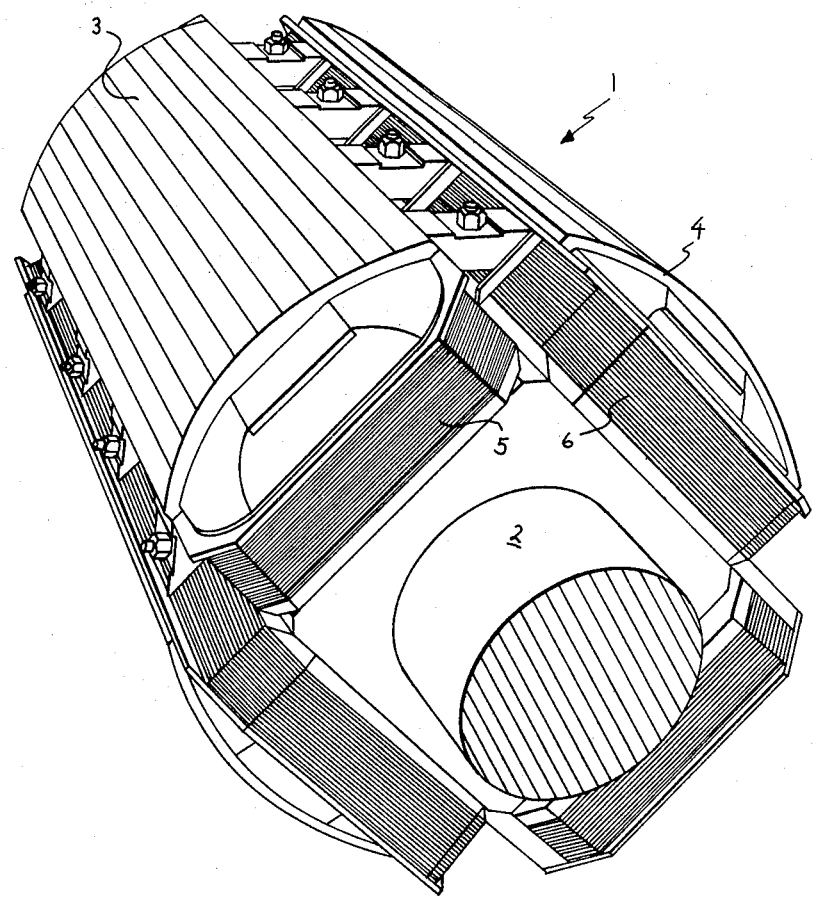
FIG. 1 is a perspective view of a portion of a dynamoelectric machine rotor showing four salient field poles having windings constructed according to the teaching of the invention.

To help orient the reader relative to a typical application for the invention, in order to facilitate a description of the invention, reference is first made to FIG. 1 where there is shown a portion of a dynamoelectric machine 1 including a central shaft 2 on which there are mounted in conventional manner a plurality of four salient field poles, two of which are designated as poles 3 and 4. Typically, such poles are fabricated on a plurality of pre-formed laminations clamped together, mounted on the shaft and surrounded by energizing windings, such as the windings 5 and 6, respectively, on poles 3 and 4. The type of windings shown in this embodiment of the invention are formed of copper stock having a generally rectangular cross-section and coiled to place the respective turns of the windings on top of each other in face-to-face relationship. Due to the length of each turn in the coils or windings 5 and 6, a substantial turn-to-turn voltage exists when the windings are energized. Accordingly, the turns of the windings 5 and 6 must be insulated from one another to enable them to perform their desired pole energizing function. The windings 5 and 6 (and the other windings shown) are constructed in accordance with the present invention so that a unique electrical insulating sheet material is positioned between each of the winding turns to completely insulate them from one another. The insulating sheet material is applied to the turns of the windings in a particular arrangement that will be more fully described below; however, before further discussing the characteristic features of windings made with the invention, such as the windings 5 and 6 shown in FIG. 1, reference will now be made to FIG. 2 of the drawing in order to describe various forms of electrical insulating sheet material made in accordance with the invention.

Considering first the sheet of electrical insulating material 7 shown in sub-FIG. 2A; according to the invention, this sheet is made of a suitable non-cellulosic paper, such as aramid paper, and a coating of thermosetting resinous adhesive material that is in a solid but heat bondable state and is substantially uniformly distributed over at least one side of the base aramid paper. The coating of heat bondable resinous adhesive material is designated by the reference numeral 8 and in the embodiment of the invention shown in FIG. 2A extends over substantially all of upper and lower surfaces of the sheet 7. In the embodiment being described the coated sheet of aramid paper is in the range of 0.005" to 0.01" thick. Combined with the sheet 7 and the coating 8 thereon, there is provided a pressure sensitive adhesive material which is applied over the heat bondable resinous adhesive coating 8 in a pattern of large and small circles 9a and 9b which may be of any predetermined configuration, and may either be filled, or simply circular line patterns, as shown. However, it should be understood that we have found it desirable to limit to about 1" the maximum distance between any point on the sheet 7 not covered with this pressure sensitive adhesive material and the closest point in the pattern defined by the circles 9a and 9b. Alternative embodiments of the invention could be successful wherein only one side of the sheet 7 is coated with heat bondable resin.

The purpose of the pressure sensitive adhesive pattern on the sheet 7 is to provide a holding means for initially securing the sheet 7 and coating 8 against the face of a metal conductor that is to be insulated. For example, as will be more fully explained below, if a sheet of such insulating material is to be used to form the turn-to-turn insulation of a winding such as winding 5 or 6 shown in FIG. 1, the sheet 7 can be pre-cut to a desired size to cover a predetermined portion of one face of a winding turn and then pressed onto that face of the winding to cause the pressure sensitive adhesive circles 9a, 9b, etc., to hold the sheet in position between the turns of the winding until the coating of resinous adhesive material 8 is heated and pressed to cure it and bond the sheet 7 to the face of the winding turn. A variety of different patterns of pressure sensitive material have been found suitable for practicing the invention, as will be discussed further below with reference to sub-FIGS. 2B through 2F, which show examples of such alternative patterns. Also, is should be understood that while pre-cut sheets of aramid paper are used in the preferred embodiment being described, in other applications of the invention the sheets of aramid paper may be cut in place on wound or fabricated coil assemblies. In such alternative applications the pressure sensitive adhesive patterns on the sheet 7 are particularly helpful in securing the sheets in position during the necessary cutting operation.

Various suitable commercially available papers and thermosetting adhesive materials and tackifiers may be used to form sheets of insulating material in practicing various applications of the invention. A particularly preferred form of the invention utilizes a sheet of aramid paper, such as paper 7 shown in FIG. 2A, available from DuPont Company of Wilmington, Del., under the tradename NOMEX. NOMEX paper, for example, is composed of two different forms of the same polymer: short generally straight fibers or floc and smaller more tortuous fibrous binder particles. After processing on conventional paper-making equipment, these two constituents are permanently bonded together without additional binders, fillers or particles of different sizes being used. Alternatively, other non-cellulosic papers that will not compress or creep significantly under high temperature and pressure are acceptable for practicing the invention provided they have suitable heat aging and dielectric properties.

A preferred formulation for the coating solution of the thermosetting resinous adhesive material 8 used to coat at least one side (and in the preferred embodiment, both sides) of the aramid sheet 7 comprises:

| Parts By Weight | Ingredient |
|---|---|
| 31 | Araldite 6060 Epoxy resin |
| 1.6 | Dicyandiamide |
| 0.8 | 2-Ethyl-4-Methylimidazole (10% solution in cellosolve) |
| 8.1 | Min-U-Sil |
| 30.5 | Cellosolve |
| 8.0 | Aerosil OX 50 |
| 20.0 | Glass fibers (approximately 0.0005" in diameter by 0.15" in length) |

The Araldite epoxy resin is a diglycidyl ether of Bisphenol A. The composition is dispersed to form a homogeneous enamel for application on the aramid paper. Additional examples of suitable alternative heat bondable adhesive resins (8) for use in practicing the invention are described in co-pending U.S. patent application Ser. No. 713,440, filed Aug. 11, 1976 for one of the inventors named in this application, and assigned to the same assignee as is this invention.

For the preferred pressure sensitive adhesive used to make the circles 9a and 9b on the coating 8 of thermosetting resin on aramid sheet 7, as shown in FIG. 2A, it has been found that a commercially available product such as that available under the tradename Duro-Tack 80-1003, available from National Starch and Chemical Company is very effective. Alternatively, a co-reactive pressure sensitive adhesive formulation such as the following will also provide excellent results:

| Parts By Weight | Ingredient |
|---|---|
| 15 | Epon 836 |
| 30 | Co-polymer of Ethyloctyl Acetate and Vinyl Acetate (available from National Starch and Chemical Company under order number 80-1049) |
| 30 | Dicyandiamide (in a 13% solution). |

We have found that electrical insulating sheet material made according to the invention utilizing these suitable component materials exhibits a minimum of 20 grams of peel strength, pursuant to an object of the invention. After cure, a bond strength in the range of 300 to 500 pounds per square inch is exhibited by the adhesive at room temperature, between 100 and 200 pounds per square inch at 130° C. and a bond strength of 50 to 170 pounds per square inch at 155° C. Thus, electrical insulating sheet material made according to the invention has excellent thermal stability for application in manufacturing electrical windings for dynamoelectric machines and high voltage power transformers which must operate in these temperature ranges over long periods of time. And, with the desired minimum peel strength of 20 grams or more the sheets are easy to work and reliable to install when using either pre-cut sheets or sheets cut to form after being mounted on wound coils.

As mentioned above, it has been found that a wide variety of different patterns of pressure sensitive adhesive material can be used successfully in lieu of the circles 9a and 9b (as repetitions thereof) shown in FIG. 2A, in practicing the invention to form electrical insulating sheet material that is particularly adaptable for use in insulating the turns of electrical windings from one another. Examples of such other pressure sensitive adhesive patterns are shown in FIGS. 2B–2F, with the pressure sensitive adhesive patterns being indicated in each of these exhibits by the dark lines and areas, while an aramid sheet 7 and a coating of suitable heat bondable thermosetting resinous adhesive material 8, in a solid state, is shown distributed uniformly over at least one side of the sheet 7.

In the preferred embodiments of the invention shown in FIGS. 2A–2F, the patterns of pressure sensitive adhesive material designated by the interconnected lines 9 or by the circles 9a, 9b, the stars 10 in FIG. 2C, or the large stripes 9a' and small stripes 9b' in FIGS. 2E and 2F, are applied over the respective coatings of resinous adhesive material 8 on the respective sheets of aramid paper 7. This is possible because it has been found that when the thermosetting resinous adhesive material is cured under pressure it will strike through the pattern of pressure sensitive adhesive material and form a good bond with a metal winding on which the insulating sheet 7 is mounted. Of course, it will be recognized that in some applications of the invention the heat bondable thermosetting resinous adhesive material may be applied substantially uniformly across the surface of an aramid sheet 7, except for areas occupied by the pattern of pressure sensitive adhesive.

In another alternative form of the invention the coating of resinous adhesive heat bondable material is distributed over only one side of a sheet of aramid paper 7 and a selected pattern of pressure senstiive adhesive material is applied to at least one side of the coated sheet of aramid paper to form a sheet of electrical insulating material according to the invention. Thus, as can be seen by referring to the various patterns shown in FIG. 2 the pattern of pressure sensitive adhesive material may comprise either a plurality of uniformly spaced, substantially identical geometric designs such as the circles 9a, 9b shown in FIG. 2A, the starred pattern 10 shown in FIG. 2C or the diamond configurations 9a', 9b' shown in FIG. 2F. Alternatively, the pattern of pressure sensitive adhesive material used in practicing the invention can comprise a web of interconnected lines such as those shown by the lines 9 in FIGS. 2B and 2D. Other patterns such as a plurality of spaced, substantially identical figures of any predetermined design that satisfies the above-noted maximum spacing between pressure sensitive adhesive covered areas may be used to arrange sufficient adhesive within those desirable space limitations.

Figure 3:
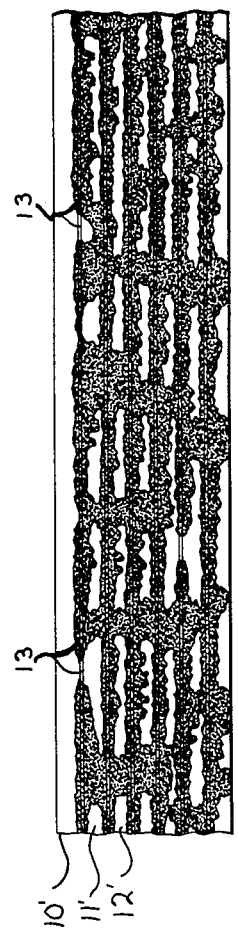
FIG. 3 is a side elevation of a portion of a prior art winding for a dynamoelectric machine field, showing bonding shellac and asbestos sheet material that have been forced from between turns of the winding by the combined action of heat and compressive force applied to the winding during a typical molding operation.

In addition to the desirable bond strength of at least 50 pounds per square inch (p.s.i.) at 155° C. attainable with insulating electrical sheet material made according to the invention, its freedom from extrusion and creepage are particularly advantageous characteristics that make it very useful to form bonding insulation between the respective turns of electrical windings of the type commonly used on dynamoelectric machines such as those shown in FIG. 1. As mentioned above, heretofore it was common practice to employ sheets of asbestos material coated with a shellac bonding agent to form such inter-coil layers of insulation. For comparison purposes, there is shown in FIG. 3 of the drawing a section of a coil that was manufactured by positioning sheets of asbestos material painted with a shellac bonding agent between the winding turns. As can be seen, the shellac has extruded from between the turns of the winding due to the high pressure and high baking temperature applied to the winding to completely flatten the sides of the turns and cure the bonding agent. Due to this kind of massive extrusion of prior art winding turn insulating materials, such as asbestos and other combinations like NOMEX paper with epoxy resins or NOMEX with beta glass and epoxy resins, all of which suffer an equivalent undesirable degree of extrusion and creepage of the base insulating paper from between the turns of the windings, it was always necessary when using such systems to scrape or otherwise manually remove the extruded materials from the windings to clean them before they could be placed in use. Frequently such scraping operations caused burrs to be formed or created other sharp discontinuities in the edges of the windings. These burrs often subsequently caused electrical breakdown of the insulation between adjacent turns of the winding.

Figure 4:
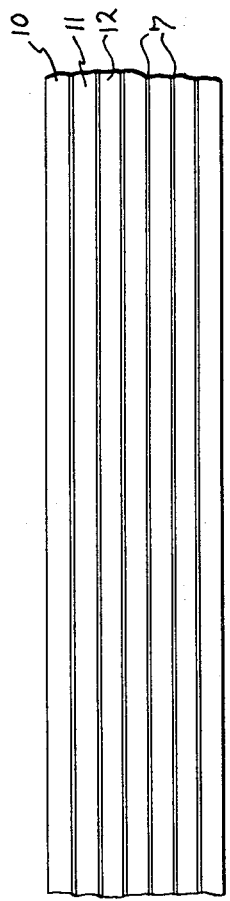
FIG. 4 is a side elevation of a portion of a dynamoelectric machine field winding insulated with the electrical insulating sheet material of the invention, showing a clean, unmarred side of the winding as it exists immediately after the winding has been compressed and baked to bond the insulating sheet material to the respective facing sides of the winding turns.

A remarkably different result is obtained when insulating sheet material made according to the invention, as described above, is applied to insulate the turns of such a winding. An example of a winding made pursuant to the invention is illustrated in FIG. 4. As can be seen by comparing FIG. 4 with FIG. 3, there is virtually no extrusion of either the resinous adhesive bonding material 8 or the pressure sensitive adhesive material 9, 9a, 9b, etc., on the sheet 7 of insulating material shown between the respective winding turns 10, 11, 12, etc., in FIG. 4. This compares very favorably with the heavy build-up 13 of extruded material (such as epoxy resin) shown between related winding turns 10', 11' and 12' in the prior art form of winding illustrated in FIG. 3. This graphic illustration clearly demonstrates that essentially no manual cleaning of the edges of a winding formed with the insulating sheet of the invention is needed to prepare it for mounting and assembly on a winding form such as that shown for the windings 5 and 6 in FIG. 1 of the drawing.

These desirable characteristics of an electrical winding insulated according to the invention can be obtained by simply precutting sheets of the insulation to substantially completely cover the facing surfaces of adjacent turns of the winding; pressing the precut pieces of insulating material 7 to secure the pressure sensitive adhesive 9 or 9a, 9b, etc., to the face of the winding and then compressing the winding and baking it at a predetermined temperature to fully cure the coating of heat bondable resinous adhesive material 8 to complete a winding suitable for use as the field winding of a dynamoelectric machine or as the winding of an electrical power transformer. However, in practicing the most preferred embodiment of the invention to manufacture an insulated electrical winding a particular arrangement of the sheets of insulating material formed according to the invention is used, as will now be explained with reference to FIG. 5.

Figure 5:
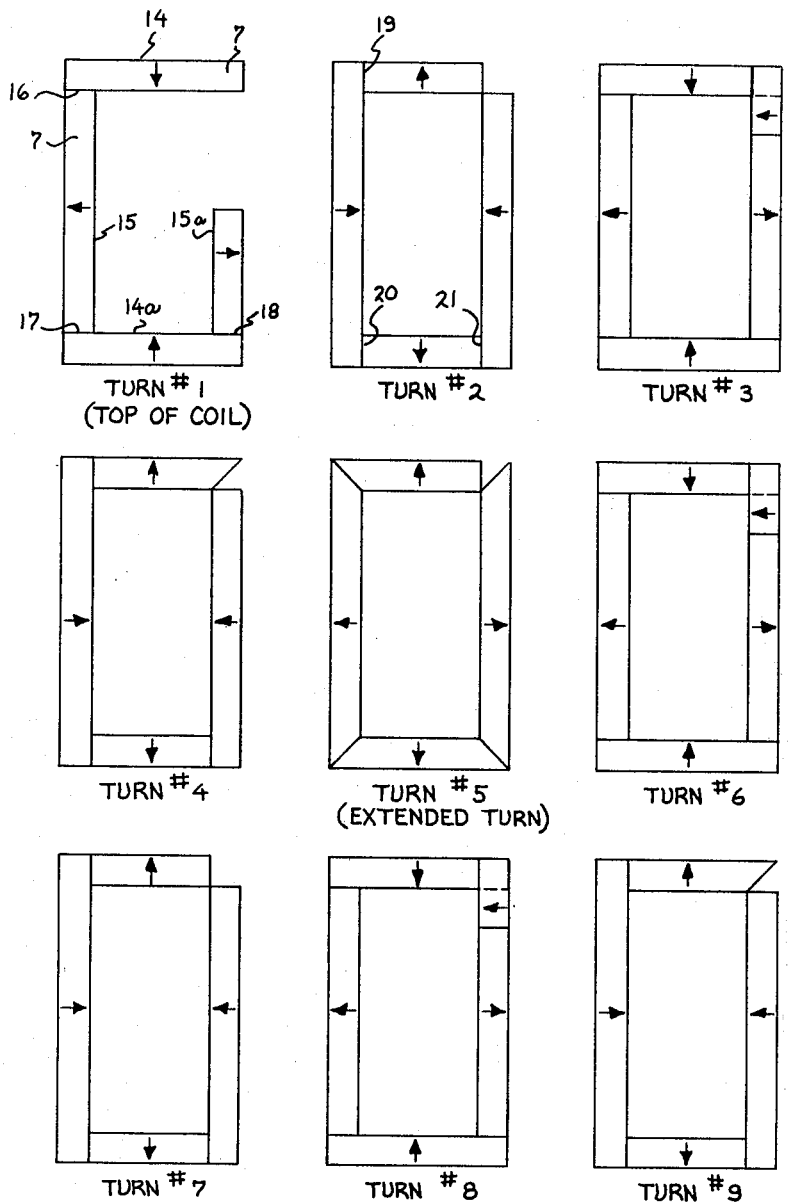
FIG. 5 illustrates a sequence of nine arragements of electrical insulating sheets constructed pursuant to the invention to completely insulate nine turns of a dynamoelectric machine winding from each other according to the invention.

In FIG. 5 there are shown nine separate turns, as numbered, of an electrical winding that for purposes of discussion may be assumed to be a field winding, such as the windings 5 or 6 shown in FIG. 1. As shown, such a winding comprises a plurality of generally flat-sided turns of electrically conductive metal, such as copper, stacked with respective flat sides of the winding turns in facing relationship. In a basic form of the present invention a plurality of sheets of electrical insulating material formed as described above of a basic aramid paper 7 coated with a heat bondable but hardened adhesive material 8 and a pattern of pressure sensitive adhesive material 9 or 9a, 9b, etc., are positioned, respectively, between the facing sides of the winding turns to electrically insulate the turns from each other. The pressure sensitive adhesive holds the sheet 7 to the coils with a minimum peel strength of 20 grams or more, in accordance with the invention. Subsequently, the thermosetting resinous adhesive material 8 on each sheet of aramid paper 7 is cured under predetermined heat and pressure to form a bond between each sheet of aramid paper and the turn of the winding juxtaposed with it.

In an electrical winding such as that shown in FIG. 5, constructed pursuant to the invention, wherein the winding forms a dynamoelectric machine field winding having generally straight side and end portions 14–14a and 15–15a, respectively, each of the sheets of coated aramid paper fabricated according to the invention are accurately cut into length to form a continuous series of tightly abutting sheets extending substantially the full length of the facing sides of the turns of the winding as shown on the respective turns 1 through 9 by the junction lines 16, 17, 18, 19, 20 and 21 shown on turns 1 and 2 in FIG. 5.

In order to prevent the junctions of abutting ends of the coated aramid sheet material from overlying one another on adjacent turns of the winding, pursuant to the teaching of the invention, the cut sheets of insulating material are carefully arranged to prevent such an overlying of the junctions by cutting the respective sheets of insulating material to the lengths and in the configurations shown for the respective turns in FIG. 5. As mentioned above, this is done by holding the tight fits between adjacent sheets to a tolerance of +0.000 to −0.060 inches in this embodiment.

In the most preferred embodiment of such a winding constructed according to the invention each sheet of insulating material, such as the respective sheet 7, indicated for example in FIG. 4, is folded sharply, i.e., at an angle of essentially 180 degrees, around one side of the winding turn and covers substantially all of the two generally flat sides of the winding adjacent the fold. A significant feature of the invention is that the aramid paper sheet 7 and adhesives 8 and 9 can be thus sharply folded without breaking or creeping sufficiently to destroy their insulating capabilities.

Such an optimum arrangement of folded sheets of insulating material is clearly indicated by the small arrows shown on the respective turns 1 through 9 in FIG. 5 of the field winding depicted. Each of the small arrows points away from the fold in the sheet of insulating material toward the open edges thereof. Thus, on the end portion 14 of turn 1 of the winding turn shown in FIG. 5, the folded sheet of insulating material 7 substantially covers both sides of the winding end portion 14 and extends around the upper edge thereof. In like manner, the insulating sheet 7 on the side portions 15 and 15a of turn 1 covers both sides thereof and extends around the respective inner edges of the winding. This folding sequence continues, as shown by the different lengths and cuts of the respective winding sheets on the side and end portions of the succeeding turns 2–9 of the winding. It will be noted that for turns 4, 5 and 9 the upper right-hand corner of the sheets of insulating material are cut at 45° angles on the respective end and side portions to prevent the junctions of the abutting sheets of insulating material on adjacent winding from directly overlying one another. Likewise, the sheets of folded insulating material are terminated short of the upper right-hand corner of the respective windings on turns 3, 6 and 8 in the manner shown in FIG. 5. With this arrangement of the sheets of insulating material it will be seen that in this preferred embodiment of the invention approximately ½ of the folds in the sheets of insulating material cover an inner side or end portion of the winding turns while the folds in the remainder of the sheets of insulating material cover an outer side or end portion of the winding turns. Obviously, alternative arrangements of the winding sheets can be used to afford the desired objective of the invention of completely covering facing sides of adjacent turns of the winding while at the same time preventing overlying of the junctions between abutting sheets of insulating material.

For example, if a field coil is to be made with a number of extended turns to provide increased cooling capability for the coil, as is common, each of the extended turns will be covered by sheets of insulating material (7) folded around the respective inner (or non-extended) sides of these turns. Accordingly, some rearrangement of the folds in insulating material on adjacent turns described above with reference to FIG. 5 may be needed to maintain the desired alternate arrangement of folds on adjacent winding turns. Those skilled in the art will understand that in such an extended turn coil the majority of turns are substantially equal in width but a given number of extended turns are significantly greater in width, i.e., about ⅜" greater in width, than the majority of turns so an outer portion of these wider coils extends beyond the outer sides of the coil to act as cooling fins.

From the foregoing description of the invention it will be apparent to those skilled in the art that various alternative embodiments and modifications of the invention may be used in practicing it to make suitable sheets of insulating material and insulated electrical windings; accordingly, it is our intention to encompass within the following claims the true spirit and scope of the invention.

What we claim as new and desire to secure by Letters Patent of the United States is:

1. An electrical insulating sheet material comprising a sheet of aramid paper, a coating of thermosetting resinous adhesive material in a solid but heat bondable state and substantially uniformly distributed over at least one side of the aramid paper sheet, and a pressure sensitive adhesive material applied in a pattern to at least one side of the resin-coated aramid paper sheet, said pattern being of predetermined configuration to limit to a predetermined maximum distance the spacing between any point on the sheet not covered with pressure sensitive adhesive material and the closest point in the pattern of pressure sensitive adhesive material, said pressure sensitive adhesive material having a predetermined peel strength sufficient to hold the paper to a surface before the thermosetting adhesive is bonded thereto.

2. An invention as defined in claim 1 wherein said pattern of pressure sensitive adhesive material is applied over the coating of resinous adhesive material on the aramid paper.

3. An invention as defined in claim 2 wherein said coating of thermosetting resinous adhesive material is distributed over both sides of said sheet of aramid paper, said predetermined peel strength is equal to a minimum of 20 grams, and said predetermined maximum distance is one inch.

4. An invention as defined in claim 3 wherein said pattern comprises a plurality of uniformly spaced, substantially identical geometric designs.

5. An invention as defined in claim 3 wherein said pattern comprises a web of inter-connected lines.

6. An invention as defined in claim 3 wherein said pattern comprises a plurality of spaced, substantially identical figures.

7. An invention as defined in claim 3 wherein said pattern comprises a plurality of wide and narrow stripes.

8. An insulated electrical winding comprising a plurality of generally flat-sided turns of electrically conductive metal stacked with respective flat sides in facing relationship, a plurality of sheets of electrical insulating material as defined in claim 1 positioned, respectively, between facing sides of said turns to electrically insulate the turns from each other, the thermosetting resinous adhesive material on each sheet of aramid paper being cured to form a bond having a minimum strength of 50 p.s.i. at 155° C. with the turn juxtaposed therewith.

* * * * *